United States Patent [19]

Liu

[11] Patent Number: 5,834,919
[45] Date of Patent: Nov. 10, 1998

[54] STRUCTURE OF CELLULAR TELEPHONE BATTERY CHARGER

[75] Inventor: Chu-Chang Liu, San Chang, Taiwan

[73] Assignee: High Morals Steel Mold Co., Ltd., San Chan, Taiwan

[21] Appl. No.: 676,839

[22] Filed: Jul. 8, 1996

[51] Int. Cl.$^6$ ..................................................... H01N 10/46
[52] U.S. Cl. ................................. 320/2; 429/96; D13/103
[58] Field of Search .......................... 320/2; 429/96–100; D13/103, 107

[56] References Cited

U.S. PATENT DOCUMENTS

| | | | |
|---|---|---|---|
| 4,636,703 | 1/1987 | Toyya et al. | 320/2 |
| 5,160,879 | 11/1992 | Tortola et al. | 320/2 |
| 5,162,719 | 11/1992 | Tomura et al. | 320/2 |
| 5,494,449 | 2/1996 | Chioo | 439/761 |

*Primary Examiner*—Peter S. Wong
*Assistant Examiner*—Gregory J. Toatley, Jr.
*Attorney, Agent, or Firm*—Bacon & Thomas

[57] ABSTRACT

A cellular telephone battery charger including a casing having an open charging chamber with electrode terminals at the front side adapted for receiving and charging a cellular telephone battery and a plurality transverse mounting slots and recessed portions at the back side, a mounting frame fixedly mounted inside the casing to hold two metal contact plates, a transformer/charging control circuit connected between the metal contact plates and the electrode terminals, and a plurality of plugs pivotably mounted in the transverse mounting slots and turned between the operative position perpendicular to the casing and connected to the metal contact plates for connection to an electric socket, and the non-operative position disconnected from the metal contact plates and received in the recessed portions of the casing.

3 Claims, 2 Drawing Sheets

4,834,919

STRUCTURE OF CELLULAR TELEPHONE BATTERY CHARGER

BACKGROUND OF THE INVENTION

The present invention relates to cellular telephone battery chargers, and relates more particularly to such a cellular telephone battery charger which is applicable for connecting to any of a variety of electric power supply outlet sockets of to change the voltage of any of a variety of currents to a fixed level for charging a cellular telephone battery.

Cellular telephones have become more and more popular everywhere in the world for the advantage of high mobility. More particularly, when the GSM system cellular telephones are developed, cellular telephones are allowed to be directly used in different countries. Because a cellular telephone uses a battery for electric power supply, the battery of a cellular telephone must be regularly charged. Various battery chargers have been developed for this purpose. However, regular cellular telephone battery chargers are specifically designed for use with a particular power supply (for example 110 V or 220 V) and for connection to a particular electric outlet socket (for example a two-hole socket or three-hole socket). Because different countries may provide different voltages of city power supply, different cellular telephone battery chargers shall be used. It is neither economic nor convenient to a cellular telephone user to carry various cellular telephone battery chargers when traveling in different countries.

SUMMARY OF THE INVENTION

The present invention has been accomplished to provide a cellular telephone battery charger which eliminates the aforesaid problems. According to one aspect of the present invention, the cellular telephone battery charger comprises a casing having an open charging chamber with electrode terminals at the front side adapted for receiving and charging a cellular telephone battery and a plurality transverse mounting slots and recessed portions at the back side, a mounting frame fixedly mounted inside the casing to hold two metal contact plates, a transformer/charging control circuit connected between the metal contact plates and the electrode terminals, and a plurality of plugs pivotably mounted in the transverse mounting slots and turned between the operative position perpendicular to the casing and connected to the metal contact plates for connection to an electric socket, and the non-operative position disconnected from the metal contact plates and received in the recessed portions of the casing. According to another aspect of the present invention, the plugs can be made in any of a variety of forms, for example, they can be made having two round blades, two round blades with one grounding prong, two flat blades, or two flat blades with one grounding prong, etc.

DETAILED DESCRIPTION OF THE PREFERRED EMBODIMENT

Figure 1:
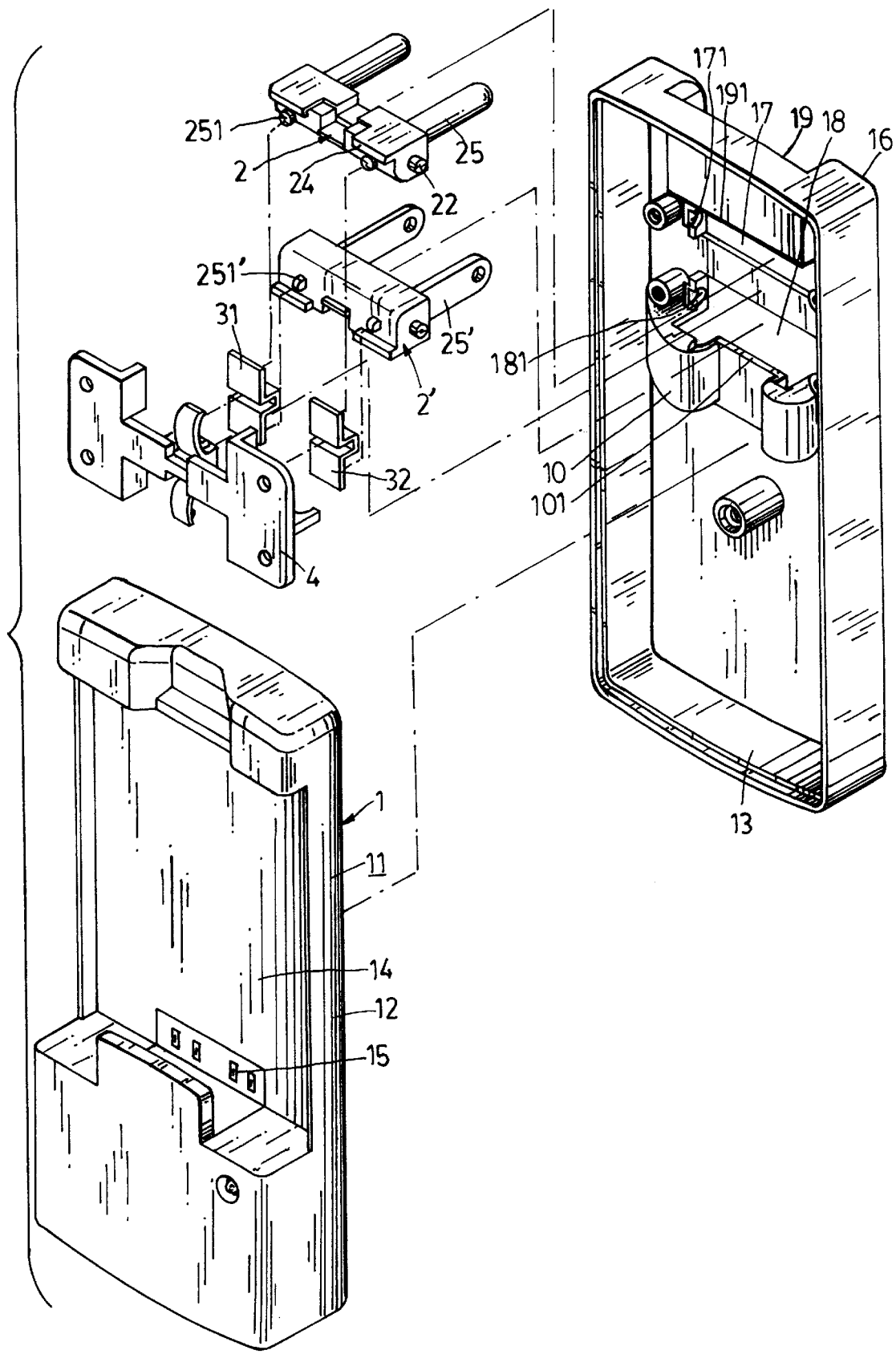
FIG. 1 is an exploded view of a cellular telephone battery charger according to the present invention.
Figure 3:
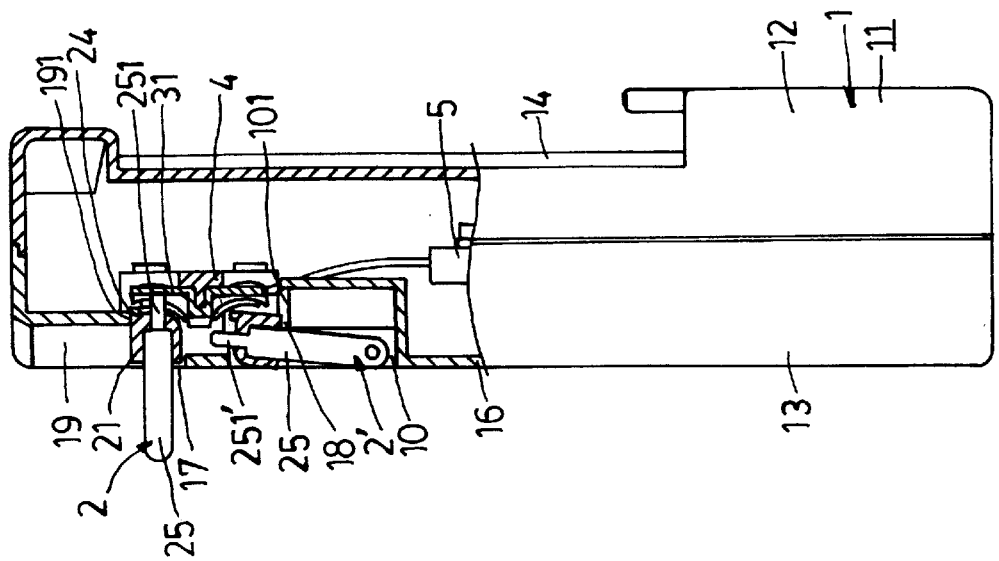
FIG. 3 is a sectional side view of FIG. 2.
Figure 2:
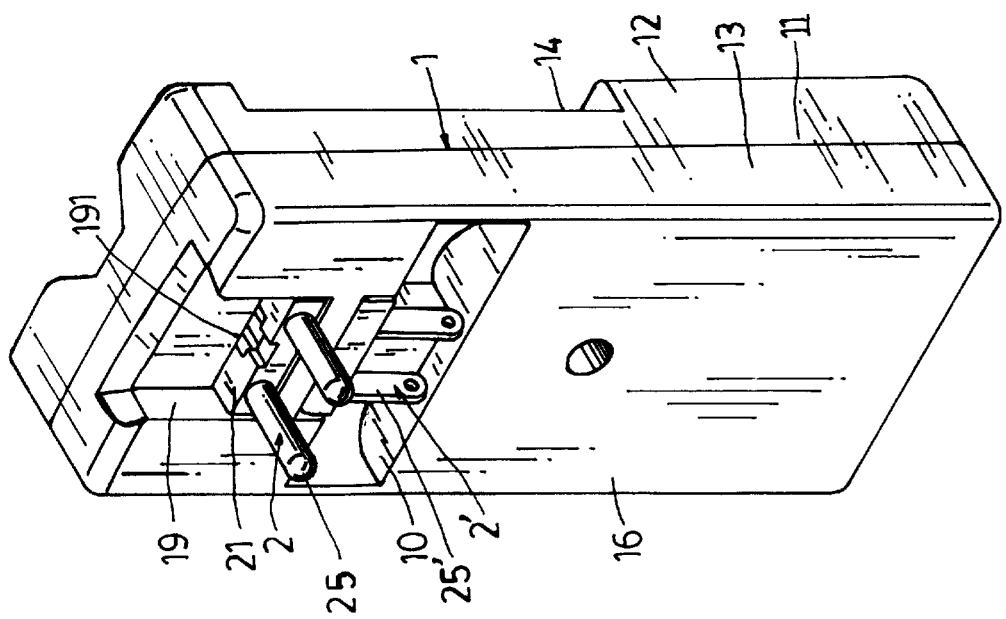
FIG. 2 is an elevational view of the cellular telephone battery charger shown in FIG. 1.

Referring to FIGS. 1 and 2, the battery charger, referenced by 1, comprises a casing 11. The casing 11 is comprised of a front shell 12 and a rear shell 13 connected together. The front shell 12 of the casing 11 comprises an open charging chamber 14 at the front side, and a plurality of electrode terminals 15 mounted in the open charging chamber 14 for charging cellular telephone battery. The rear shell 13 of the casing 11 comprises a back wall 16, two transverse mounting slots 17 and 18 formed in the back wall 16 at different elevations, two recessed portions 19 and 10 formed in the back wall 16 on the outside and respectively extending from the transverse mounting slots 17 and 18, two pairs of pivot holes 171 and 181 respectively disposed in the transverse mounting slots 17 and 18 at two opposite ends. Two plugs 2 and 2' are respectively mounted in the transverse mounting slots 17 and 18. The plugs 2 and 2' may be variously embodied. As an example of the present invention, the plug 2 has two round blades 25; the plug 2' has two flat blades 25'. Each of the plugs 2 and 2' comprises a base 21, two pivots 22 raised from two opposite sides of the base 21 and adapted for pivotably connecting to the pivot holes 171 or 181 of the transverse mounting slots 17 or 18. The base 21 of each of the plugs 2 and 2' has projecting portions 24. When the plug 2 or 2' is turned outwards to the operative position perpendicular to the back wall 16, the projecting portions 24 are stopped at a stop edge 191 or 101 in the recessed portion 19 or 10 to hold the plug 2 or 2' in the operative position. The plug 2 or 2' further comprises two electric contacts 251 or 251' raised from the back side of the base 21 and respectively connected to the blades 25 or 25'. When the plug 2 or 2' is turned to the operative position, the electric contacts 251 or 251' are forced into contact with two metal contact plates 31 and 32 (see FIG. 3). the metal contact plates 31 and 32 are mounted on a mounting frame 4, and respectively connected to a transformer/charging control circuit 5. The mounting frame 4 is fixedly mounted inside the casing 11 behind the bases 21 of the plugs 2 and 2'. The transformer/charging control circuit 5 has an input end connected to the metal contact plates 31 and 32, and an output end connected to the electrode terminals 15 for charging a cellular telephone battery which is inserted in the open charging chamber 14. It automatically detects the voltage level of the electric power supply being connected to the plug 2 or 2', changes the voltage of the electric current subject to a predetermined level, and charges the cellular telephone battery being inserted in the open charging chamber 14. Because the transformer/charging control circuit 5 is of the known art, it is not described in detail.

Referring to FIGS. 2 and 3 again, when not in use, the plugs 2 and 2' are turned inwards to the collapsed (non-operative) position and received in the recessed portions 19 and 10 respectively; when in use, the plug 2 or 2' is turned outwards from the collapsed position in the recessed portion 19 or 10 to the operative position perpendicular to the back wall 16 for connection to an electric power supply outlet socket. When the plug 2 or 2' is turned to the operative position, the electric contacts 251 or 251' are forced into contact with the metal contact plates 31 and 32 respectively, therefore electric power supply is transmitted through the blades 25 or 25' to the transformer/charging control circuit 5 through the metal contact plates 31 and 32 for charging the battery.

While only one embodiment of the present invention has been shown and described, it will be understood that various modifications and changes could be made thereunto without departing from the spirit and scope of the invention. For example, the plug 2 or 2' may be equipped with two blades and one grounding prong.

What the invention claimed is:

1. A cellular telephone battery charger comprising:
    a casing, said casing comprised of a front shell and a rear shell connected together, said front shell comprising an open charging chamber at an outer side adapted for holding the cellular telephone battery to be charged, and a plurality of electrode terminals mounted in said open charging chamber for charging the cellular telephone battery being loaded in said open charging chamber, said rear shell comprising a back wall, a plurality of transverse mounting slots formed in said back wall at different elevations, a plurality of recessed portions formed in said back wall at an outer side and respectively extending from said transverse mounting slots, pairs of pivot holes respectively disposed in said transverse mounting slots at two opposite ends;

a mounting frame fixedly mounted in said front shell and facing said rear shell;

two metal contact plates bilaterally mounted on said mounting frame;

a transformer/charging control circuit adapted for changing the voltage of an electric current to the desired level for charging the cellular telephone battery being inserted in said open charging chamber, having an input end electrically connected to said metal contact plates and an output end electrically connected to said electrode terminals; and a plurality of plugs respectively mounted in said transverse mounting slots and turned between the operative position perpendicular to the back wall of said rear shell for connection to an electric power supply outlet socket, and the non-operative position received in the recessed portions of said rear shell, each of said plugs comprising a base having two pivot pins at two opposite sides respectively and pivotably inserted into the two pivot holes of one transverse mounting slot of said rear shell, two metal contact blades perpendicularly raised from said base at one side for connection to an electric power supply outlet socket, and two electric contacts respectively raised from said base at an opposite side and electrically connected to said metal contact blades, said electric contacts being forced into contact with said metal contact plates when the respective plug is turned to the operative position, said electric contacts being disconnected from said metal contact plates when the respective plug is turned to the non-operative position.

2. The cellular telephone battery charger of claim 1 wherein the metal contact blades of said plugs are flat blades.

3. The cellular telephone battery charger of claim 1 wherein the metal contact blades of said plugs are round blades.

\* \* \* \* \*